Dec. 1, 1970  K. W. WREDE  3,544,370

ANTIHYDROPLANING METHOD FOR VEHICLES

Filed Nov. 29, 1967

INVENTOR.
KENNETH W. WREDE,
BY
Herman, Davidson & Herman
ATTORNEYS.

United States Patent Office 3,544,370
Patented Dec. 1, 1970

3,544,370
ANTIHYDROPLANING METHOD FOR VEHICLES
Kenneth W. Wrede, Warner Robins, Ga.
(CMR 878, APO, N.Y. 09332)
Filed Nov. 29, 1967, Ser. No. 686,541
Int. Cl. B08b 5/00; B60b 39/02; F01b 1/08
U.S. Cl. 134—37
1 Claim

ABSTRACT OF THE DISCLOSURE

A method and apparatus for preventing hydroplaning of a vehicle tire on a wet surface by introducing forced and deflected air to the surface in front of the tire to break up the water film on the surface immediately in front of the tire, thereby increasing traction between the tire and surface.

The apparatus includes an elongated vane mounted retractably on the vehicle in front of the tire for deflecting impinging air during movement of the vehicle to the surface. The vane includes an arcuate end portion for directing the air and a plurality of conical ducts in the end portion for forming air jets to accelerate the air and direct it in a concentrated form. Provision is also made for introducing forced air into longitudinal ducts in the vane for aiding the deflected air in breaking up the water film on the surface.

---

This invention relates to a method and apparatus for preventing hydroplaning of a vehicle tire on a wet surface.

Hydroplaning is a situation which arises when water penetrates between a vehicle tire, such as an automobile or aircraft tire, and the pavement of a road or runway surface, so that the water pressure raises a portion of the tire off the pavement. This pressure increases as the speed of the vehicle increases, supporting more and more of the tire until, at a critical speed termed the "total" hydroplaning speed, the tire is supported only by the water and all contact with the pavement is lost, causing the vehicle to go out of control.

The hydroplaning speed is also dependent on the tire inflation pressure, the water depth on the pavement, the condition of the pavement surface, and the condition of the tire tread. For example, a smooth tire will hydroplane on smooth pavement in less than 0.04 inch of water. Even good tires will hydroplane when the water depth is greater than the depth of tread on the tires and the grooves in the tires become choked with water. On a smooth pavement, such tires inflated at 16 pounds have hydroplaned at a vehicle speed of 41 miles per hours, while if inflated to 24 pounds, the hydroplaning speed was found to be about 50 miles per hour. Therefore, hydroplaning may occur even in a vehicle having new tires and travelling at normal speeds.

The consequences of hydroplaning may be drastic. Depending upon the degree of hydroplaning, partial or complete loss of traction with the pavement may occur. Safe steering and braking of the vehicle may thus become impossible.

Accordingly, it is an object of this invention to provide a method and apparatus for preventing the hydroplaning of vehicle tires on wet surfaces.

A more specific object of this invention to to provide a method and apparatus for preventing the hydroplaning of vehicle tires on wet surfaces by disturbing the water film on the roadway surface which is directly in front of the vehicle tire, by the application of air, and as an optimum, attain exposure of the paved roadway surface, to assure positive gripping of this surface by the tire.

Further objects and advantages of the invention will become apparent from the following description and claim, and from the accompanying drawings, wherein:

Figure 1:
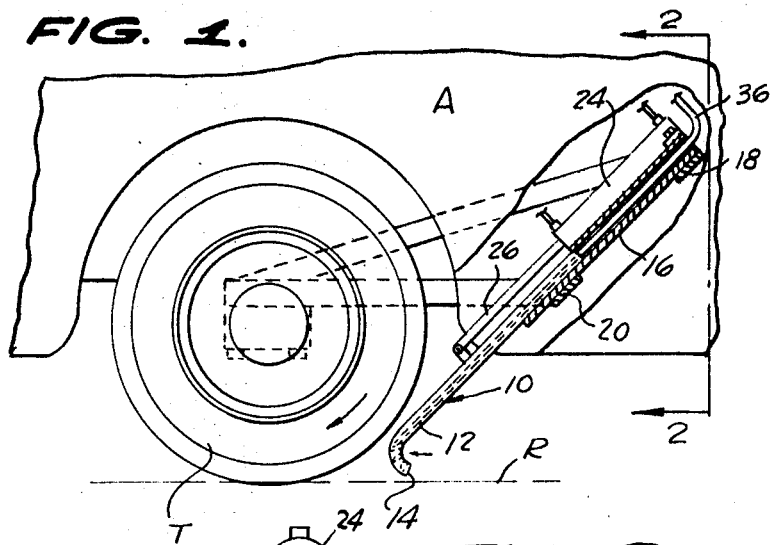
FIG. 1 is a fragmentary side view in elevation of an automobile with portions broken away for purposes of illustration, showing one form of my antihydroplaning apparatus, partly in section and partly in side elevation, attached thereto.
Figure 2:
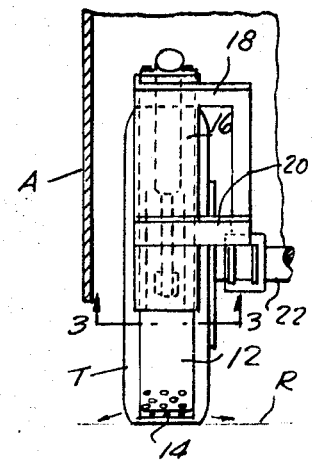
FIG. 2 is a cross-sectional view taken substantially along the plane indicated by line 2—2 of FIG. 1.
Figure 3:
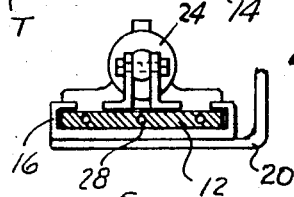
FIG. 3 is a cross-sectional view taken substantially along the plane indicated by line 3—3 of FIG. 2.
Figure 4:
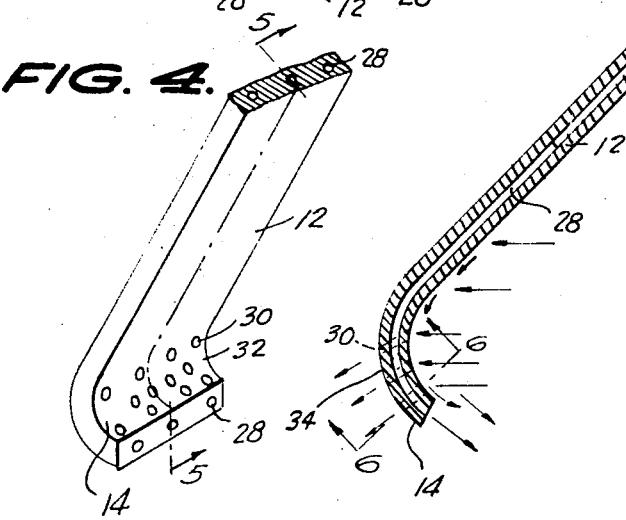
FIG. 4 is a fragmentary perspective view of the lower portion of the antihydroplaning apparatus shown in FIG. 1.

Referring now in detail to the drawing, wherein like numerals indicate like elements throughout the several views, one form of antihydroplaning apparatus is generally indicated in FIGS. 1 to 6, by the numeral 10.

Antihydroplaning apparatus 10 includes an elongated substantially planar wind-deflecting vane 12, terminating in an arcuate end portion 14. An apparatus 10 is adapted to be mounted upon an automobile A, in front of each tire.

Deflector vane 12 is slidingly retractable from a position adjacent pavement or roadway R, into an elongated tubular or channel-shaped housing 16, mounted non-rotatively by brackets 18 and 20 on an axle 22 of automobile A. A hydraulic cylinder 24, secured to housing 16, has a piston rod 26 connected to vane 12, for moving it in and out of housing 16. By suspending vane 12 from axle 22, the distance of arcuate end 14 from roadway R will remain constant, when vane 12 is in use, and will not scrape roadway R, as it might if it were suspended from the body of automobile A. The piston rod 26 should also be connected to vane 12 by a brittle "breakaway" material in the event an obstruction, such as a rock, jams the vane against the tire. This will protect the main portion of the mechanism in the event jamming occurs.

Vane 12 is generally of a solid shape-retaining metal, rubber or plastic construction, but includes a number of spaced, internal air ducts 28, running parallel to the longitudinal axis of the vane from one end to the other. Arcuate end portion 14 also includes a number of conical air ducts 30, extending through the end portion from front surface 32 to rear surface 34. Conical ducts 30 have their larger end adjacent front surface 32, tapering to a smallest dimension adjacent rear surface 34.

In use and operation, deflector vane 12 is extended to its operative position adjacent roadway R by piston rod 26 of hydraulic cylinder 24. Arcuate end portion 14 faces the direction of travel of automobile A with front surface 32.

Figure 5:
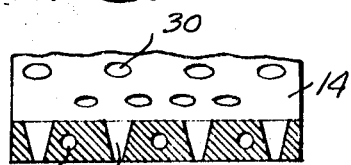
FIG. 5 is a cross-sectional view taken substantially along the plane indicated by line 5—5 of FIG. 4.
Figure 6:
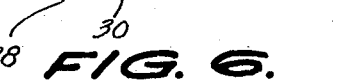
FIG. 6 is a cross-sectional view taken substantially along the plane indicated by line 6—6 of FIG. 5.

As the automobile A moves, air will impinge upon deflector vane 12, and will be partially deflected along the front surface 32 of arcuate end portion 14 onto roadway R in front of tire T, as shown by the arrows in FIG. 5. Some of this air will enter the ducts 30, and because of the reduced dimension at the duct outlet adjacent rear surface 34 will issue as a jet stream with increased velocity on roadway R immediately in front of tire T, as shown by the arrows in FIG. 5.

If roadway R is covered with a film of water, the deflected air impinging on the roadway will disturb and blow away the water immediately in front of tire T. This will expose the paved surface of roadway R, or disturb the water film on roadway R, to assure positive gripping of this surface by the tire.

To insure sufficient water disturbance, a source of compressed air carried by the vehicle can be connected to a flexible hose 36 press-fitted into the upper end of each duct 28. This will supply additional air for impingement upon roadway R.

While deflector vane 12 has been illustrated as substantially planar, it can be arcuate or V-shaped in cross-section to aid in deflection of air along its length. Furthermore, the mounting of the vane is optional, and it can be retracted electrically as well as hydraulically.

Figure 7:
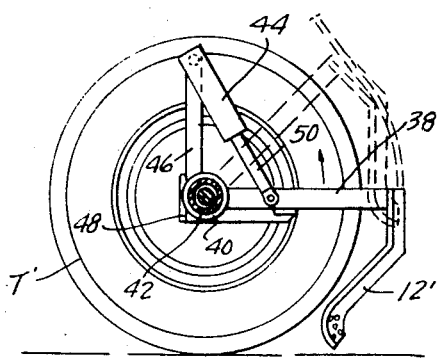
FIG. 7 is a side view in elevation of a modified form of antihydroplaning apparatus.

FIG. 7 illustrates another mounting for vane 12', identical in every respect to vane 12, except for its mounting. It is conected to a brittle "breakaway" bracket arm 38 integral with a hub 40, rotatable about a fixed or steering wheel axle 42. A hydraulic cylinder 44 is fixed to a stationary bracket arm 46 secured to a mounting bracket 48 on the wheel of tire T'. Hydraulic cylinder 44 has a piston rod 50 pivotably connected to bracket arm 38, whereby upon actuation of cylinder 44, bracket arm 38 can be rotated to either retract vane 12' to an inoperative position shown in phantom lines, or to an operative position indicated by the full lines.

The apparatus described herein is also valuable in displacing an oil film immediately in front of a tire. All roadway surfaces accumulate oil. When it rains, the oil film rides on top of the water, until after a period of time, it seeps off the top of the water, onto the side of the road.

This oil slick creates a braking hazard, by itself. By trapping water beneath it, it contributes to creating a water film and increases the chances of "total" hydroplaning. Therefore, the apparatus of the present invention finds usage in the removal of an oil film from a roadway surface, as well as disturbing a water film to prevent hydroplaning.

While a specific embodiment of my invention has been disclosed in the foregoing description, it will be understood that various modifications within the spirit of the invention may occur to those skilled in the art. Therefore, it is intended that no limitations be placed on the invention except as defined by the scope of the appended claim.

I claim:
1. A method for preventing hydroplaning of vehicle tires on a wet, paved surface comprising breaking up the water film on said paved surface immediately in front of the vehicle tire, by causing air through which the vehicle passes to impinge upon an elongated, generally planar vane mounted on the vehicle, and deflecting said impinging air to the paved surface directly in front of and across the width of the vehicle tire, said impinging air being so directed as to have one component normal to the paved surface and another component in the direction of the motion of the vehicle.

References Cited
UNITED STATES PATENTS

| | | | |
|---|---|---|---|
| 440,690 | 11/1890 | Bevin | 15—340 |
| 490,269 | 1/1893 | Chisholm | 15—340 |
| 893,878 | 7/1908 | Shires | 126—271.3 |
| 970,967 | 9/1910 | Sprint | 293—58 |
| 1,159,894 | 11/1915 | Byrnes | 280—150 |
| 1,447,004 | 2/1923 | Anthon | 180—64 |
| 1,729,754 | 10/1929 | Wenrich | 134—37 |
| 2,128,686 | 8/1938 | Andreau | 296—1 |
| 2,886,120 | 5/1959 | Broell | 180—54 |
| 2,896,246 | 7/1959 | Wildt | 15—405 |
| 3,041,748 | 7/1962 | Wetzel | 37—19 |
| 3,228,125 | 1/1966 | Wiebe | 37—12 |

ARTHUR L. LA POINT, Primary Examiner

H. BELTRAN, Assistant Examiner

U.S. Cl. X.R.

15—340, 405; 37—12, 19; 126—271.3; 152—153, 208; 180—54, 64; 239—523, 556; 261—1, 30; 280—15, 150; 291—1, 3; 293—58; 296—1